United States Patent [19]

Anderson

[11] Patent Number: 4,583,707

[45] Date of Patent: Apr. 22, 1986

[54] STORAGE HOLDER FOR A CONTAINER

[75] Inventor: Kenneth J. Anderson, Dowagiac, Mich.

[73] Assignee: Assembled Components Company, Inc., Coloma, Mich.

[21] Appl. No.: 651,724

[22] Filed: Sep. 18, 1984

[51] Int. Cl.$^4$ .............................................. E04G 3/00
[52] U.S. Cl. ...................................... 248/293; 211/85; 248/277; 248/588
[58] Field of Search .................... 248/293, 311.2, 585, 248/588, 595, 150, 161, 165, 166, 167, 188.6, 243, 244, 282, 289.1, 440, 277; 211/85, 201, 202; 297/194, 115; 108/45, 44; 224/311; 74/521

[56] References Cited

U.S. PATENT DOCUMENTS

| | | | |
|---|---|---|---|
| 585,422 | 6/1897 | Boenning | 248/588 |
| 2,708,062 | 5/1955 | Poyer | 248/311.2 |
| 2,719,414 | 10/1955 | Davis | 248/311.2 |
| 3,741,512 | 6/1973 | Olsson | 248/585 |
| 3,761,045 | 9/1973 | Sturhan | 248/588 |
| 3,784,142 | 1/1974 | O'Brien | 248/311.2 |
| 3,994,465 | 11/1976 | Rudnitzky | 248/311.2 |
| 4,191,350 | 3/1980 | Ormond | 248/293 |
| 4,434,961 | 3/1984 | Hoye | 248/311.2 |

Primary Examiner—Ramon S. Britts
Assistant Examiner—Ramon O. Ramirez
Attorney, Agent, or Firm—Flynn, Thiel, Boutell & Tanis

[57] ABSTRACT

A collapsible holder for a container having a plate-like base member and a plate-like support member. The support member has a hole therethrough along an axis perpendicular to an upwardly facing surface on the base member. Yieldable force-generating structure is interconnected between the base member and the support member for continually urging the support member and the base member from a first position wherein the base member and support members are in a mutually adjacent relation with little or no space therebetween to a second position vertically spaced from each other while maintaining the upwardly facing relation of the surface on the base member. A releasable latch structure is provided for holding the base member and the support member in the aforesaid first position. Thus, upon a release of the latch structure, the force-generating structure will urge a separation of the base member and support member to the aforesaid second position. Thus, a container resting on the upwardly facing surface on the base member will extend through the hole in the support member and be encircled thereby to stabilize the container.

16 Claims, 12 Drawing Figures

STORAGE HOLDER FOR A CONTAINER

FIELD OF THE INVENTION

This invention relates to a collapsible holder for a container and, more particularly, a holder adapted to hold, in a first position thereof, a short drinking container, namely, a container having a handle on one or more sides thereof, such as a cup or mug and, when in a second position thereof, a tall container, such as a soft drink can or a tall drinking container.

BACKGROUND OF THE INVENTION

Collapsible container holders are known in the art and U.S. Pat. Nos. 2,279,442, 2,649,270, 3,233,858, 3,637,184, 3,784,142, 3,991,961, 3,994,465 and 4,191,350 are representative examples of some of the known varieties. However, it has become apparent that the collapsible types of container holders are not well adapted or suited for holding a variety of shapes of drinking containers, such as cups or mugs having a handle on one or more sides thereof as well as a tall drinking container, such as the drinking containers acquired at fast-food restaurants or the like. Further, collapsible holders of the known variety are not well suited for being stowed in a position where they are not readily visible when not in use.

Accordingly, it is an object of this invention to provide a collapsible holder for a container wherein it may be stowed in a position not readily visible when not in use.

It is a further object of this invention to provide a collapsible holder, as aforesaid, wherein both short drinking containers, such as cups or mugs having one or more handles thereon, as well as tall drinking containers, are readily adapted for proper support by the collapsible holder.

It is a further object of the invention to provide a collapsible holder, as aforesaid, wherein the holder is pleasing in its aesthetic appearance, is durable and requires little or no maintenance to maintain a proper support for a drinking container.

It is a further object of the invention to provide a collapsible holder, as aforesaid, wherein structure is provided to automatically place the components in the required vertically spaced relation to effectively hold and support a tall drinking container.

It is a further object of the invention to provide a collapsible holder, as aforesaid, wherein the holder may be readily and easily collapsed and maintained in the collapsed position by a convenient and automatically activated latch mechanism.

It is a further object of the invention to provide a collapsible holder, as aforesaid, wherein the base member and the support member are made of a moldable synthetic resin, thereby enabling a mass production thereof at a minimum of expense.

SUMMARY OF THE INVENTION

In general, the objects and purposes of the invention are met by providing a collapsible holder for a container having a plate-like base member and a mounting structure for supporting the base member so that one of the surfaces thereon faces upwardly. The collapsible holder also has a plate-like support member having a hole therethrough along an axis perpendicular to the aforesaid upwardly facing surface. Yieldable force-generating structure is provided and interconnects the base member to the support member for continually urging the support member and base member from a first position thereof wherein the base member and support member are in a mutually adjacent relation with little or no space therebetween to a second position vertically spaced from each other while maintaining the aforesaid upwardly facing relation of the aforesaid one surface. A releasable latch is provided for holding the base member and the support member in the aforesaid first position so that upon a release of the latch structure, the yieldable force-generating structure will urge a separation of the base member and the support member to the second position. Thus, a container resting on the upwardly facing surface will extend through and be encircled by the structure defining the hole in the support member so that the container is stabilized thereby.

BRIEF DESCRIPTION OF THE DRAWINGS

Further objects and purposes of this invention will be apparent to persons acquainted with apparatus of this general type upon reading the following specification and inspecting the accompanying drawings, in which.

DETAILED DESCRIPTION

Certain terminology may be used in the following description for convenience in reference only and will not be limiting. The words "up", "down", "right" and "left" will designate directions in the drawings to which reference is made. The words "in" and "out" will refer to directions toward and away from, respectively, the geometric center of the device and designated parts thereof. Such terminology will include the words above specifically mentioned, derivatives thereof and words of similar import.

Figure 1:
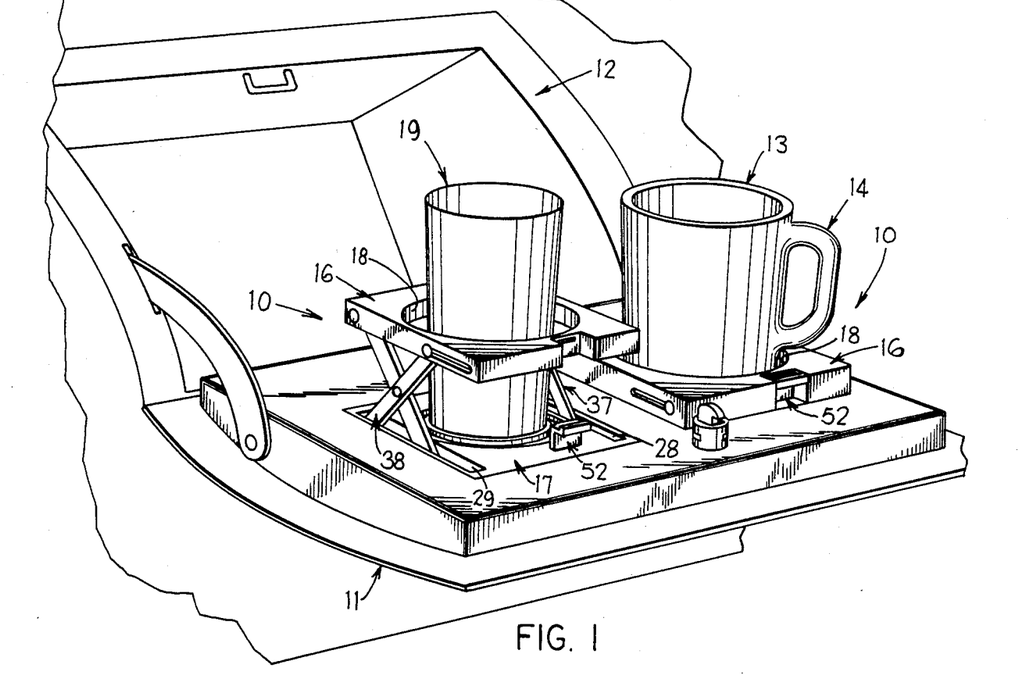
FIG. 1 a perspective view of a pair of collapsible holders in a first environment, namely, on the door of a conventional glove box in a vehicle.

A pair of collapsible holders 10 embodying the invention are illustrated in FIG. 1 in a side-by-side relation in a door 11 of a conventional glove box 12 in an automobile or other type of vehicle. The rightmost collapsible holder 10 is in the collapsed position and is adapted to hold in this position a short drinking container, such as a cup or mug 13 having a handle 14 on one or more sides thereof. The left collapsible holder 10 is in a second position of use wherein a support member 16 is elevated above a base member 17. The support member 16 has a hole 18 in the central portion thereof and is adapted to encircle a tall drinking container 19, such as a soft drink can or other type of tall glass-like drinking container.

Figures 2, 3:
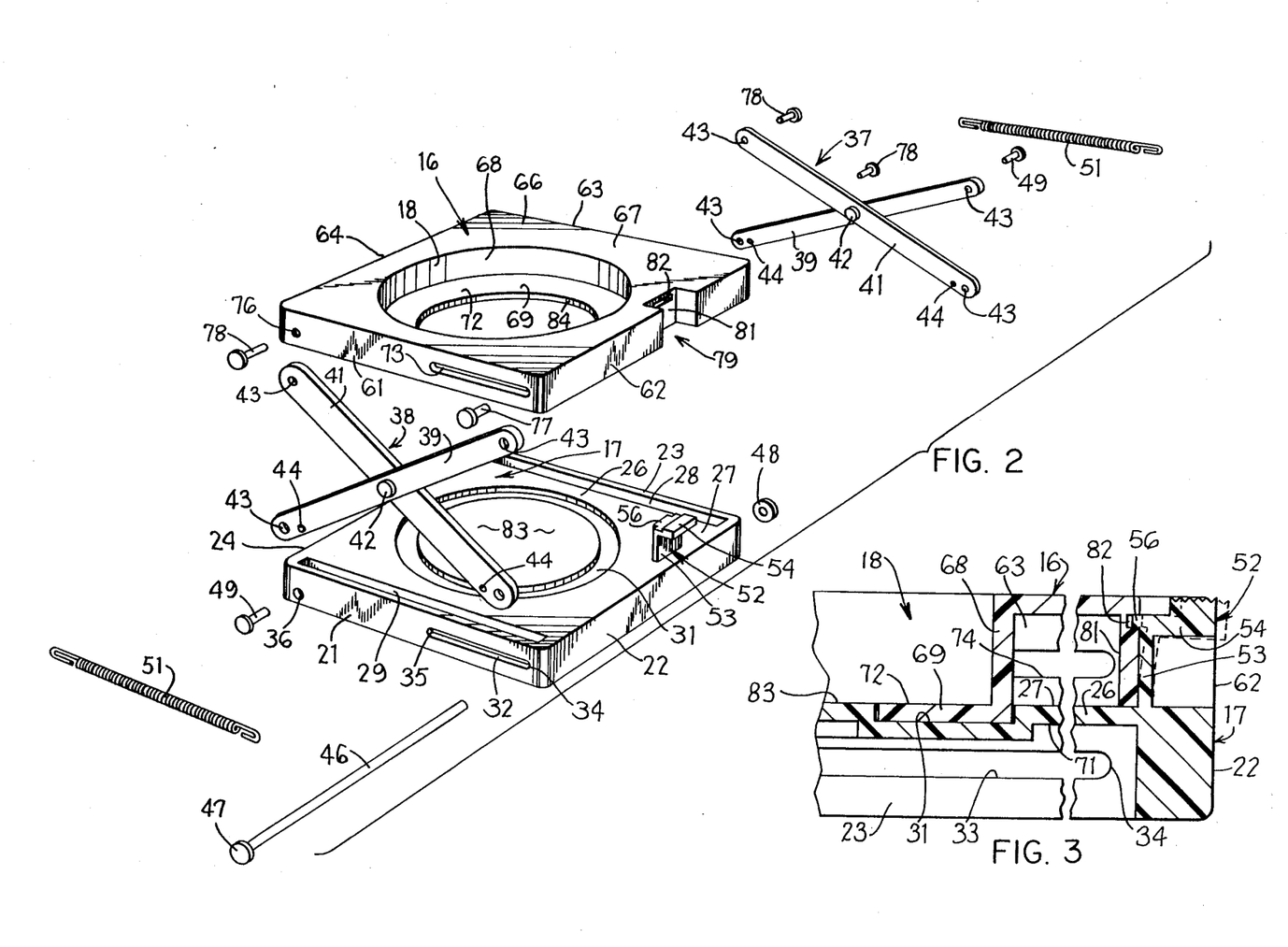
FIG. 2 is an exploded perspective view of a first embodiment of the collapsible holder.
FIG. 3 is an enlarged sectional view of the latch structure.

FIG. 2 illustrates an exploded perspective view of the collapsible holder 10 illustrated in FIG. 1. The base member 17 is made of a moldable synthetic resin material which has a rigid and durable characteristic. The base member has four vertically upright sidewalls 21, 22, 23 and 24 defining, in this embodiment, a square configuration. Each of the sidewalls is connected to each other and, adjacent their upper edges, to a top wall 26 defining an upwardly facing surface 27. A pair of laterally spaced and elongated slots 28 and 29 are provided in the top wall 26. In this particular embodiment, the slots 28 and 29 both extend through the top wall 26 from one sidewall 22 to the opposite sidewall 24 of the base member 17. A circular groove 31 is provided in the top wall 26, generally in the central region thereof. The groove 31 has a finite width and depth, the purpose of which will be discussed hereinbelow.

An elongated slot 32 is provided in the sidewall 21 and a further elongated slot 33 (FIG. 3) is provided in the opposite sidewall 23. In this particular embodiment, the slots 32 and 33 are laterally aligned with one end 34 of each thereof being located adjacent the sidewall 22. The length of each slot 32 and 33 extends along the sidewalls 21 and 23 to a location that is just slightly less than the midpoint of the sidewalls 21 and 23. In addition, and between the other end 35 of the slots 32 and 33 and the sidewall 24, a hole 36 is provided in the sidewall 21 adjacent the corner between the sidewall 21 and the sidewall 24. A further hole (not shown) is provided in the sidewall 23 adjacent the corner between the sidewalls 23 and 24 and is axially aligned with the hole 36.

A pair of linkage mechanisms 37 and 38 are provided, each being received in a respective one of the slots 28 and 29. The linkage mechanism 37 includes a pair of link members 39 and 41 pivotally secured to each other by a rivet 42. Each link member has a hole 43 extending therethrough adjacent each end. The ends of each of the link members 39 and 41 on the same side of the rivet 42 have an additional small hole 44 located adjacent the larger hole 43. The linkage mechanism 38 is identical to the linkage mechanism 37 and, accordingly, the same reference numerals utilized hereinabove are used also in association with the linkage mechanism 38. The ends of each link member 39 and 41 having the holes 43 and 44 therethrough are inserted into the slots 28 and 29 so that the holes 43 are aligned with the slots 32 and 33 as well as the axially aligned holes at the opposite end of the sidewalls 21 and 23, one of the holes 36 being illustrated in FIG. 2. An elongated bar 46 having an enlarged head 47 on one end thereof is inserted into the slot 32 and through the axially aligned orientation of the holes 43 in the linkage members 41 and thence through the slot 33. An appropriate fastener 48 is secured to the end of the elongated bar 46 remote from the enlarged head 47. Rivets 49 are received in the axially aligned holes, one of which is the hole 36. A pair of tension springs 51 are provided and the opposite ends thereof are received into the small holes 44 in each of the link members 39 and 41 to cause the elongated bar 46 to be drawn lengthwise of the slots 32 and 33 to cause the link members 39 and 41 to become oriented in an upstanding relation to the base member 17 as illustrated in FIG. 1, the leftmost holder 10.

An upstanding latch 52 is formed on the base member 17 adjacent the sidewall 22 and offset from the midlength thereof. The latch 52 includes an upstanding wall member 53 and a manually depressible lever segment 54 extending horizontally away from the upper edge of the wall member 53. The lever 54 has at the end thereof facing the central portion of the base member 17 a tab 56. A manual downward force applied to the end of the lever 54 remote from the tab will cause the wall 53 to flex to effect a movement of the tab 56 from the solid line position illustrated in FIG. 3 to the broken line position thereof.

The support member 16 has plural sidewalls 61, 62, 63 and 64 defining a square-like profile equal in size to the base member 17. That is, the sidewalls 21, 22, 23 and 24 are each coplanar with the sidewalls 61, 62, 63 and 64, respectively. A top wall 66 interconnects each of the sidewalls 61, 62, 63 and 64 together adjacent their upper edges and defines an upwardly facing surface 67. The hole 18 extends through the central portion of the top wall 66 and is generally coaxial with the annular groove 31 in the base member 17. In this particular embodiment, the hole 18 is defined by a generally upstanding cylindrical wall 68 which extends downwardly from the top wall 66 and terminates in a radially inwardly extending annular flange 69. The horizontal width of the flange 69 is slightly less than the width of the circular groove 31. Further, and as shown in FIG. 3, the flange 69 is oriented beneath a plane 71 defined by the lower edges of each of the sidewalls 61, 62, 63 and 64. Thus, the annular flange 69 is received into the circular groove 31 so that the upper surface 72 of the flange 69 is flush with the upwardly facing surface 27 on the base member 17.

An elongated slot 73 is provided in the sidewall 61 directly vertically above the slot 32 in the sidewall 21 of the base member 17. Similarly, an elongated slot 74 is provided in the sidewall 63 (FIG. 3) directly vertically above the slot 33 in the sidewall 23 of the base member 17. A hole 76 is provided in the sidewall 61 directly vertically above the hole 36 in the base member 17. Similarly, a further hole (not shown) is provided in the sidewall 63 and is axially aligned with the hole 76. As shown in FIG. 3, the bottom of the support member 16 is open, enframed by the sidewalls 61, 62, 63 and 64 and, therefore, the upper ends of the link members 39 and 41 are each received in the opening defined by the sidewalls 61, 62, 63 and 64. The holes 43 in the upper ends of the link members 39 are axially aligned with the slots 73 and 74. Rivets 77 are received in each of the slots 73 and 74 as well as the axially aligned holes 43 to effect a securement of the link member 39 to the support member 16. Similarly, the holes in the upper ends of the link members 41 are axially aligned with the hole 76 and the not shown other hole in the sidewall 63 so as to receive a rivet 78 (FIG. 4) therein to effect a pivotal securement of the link member 41 to the support member 16. It will be apparent that the rivets 77 and 78 are deformed on their ends remote from their enlarged heads to prevent a removal of the rivet once it has been installed.

A notch 79 is provided in the sidewall 62 offset from the midportion thereof and facing the latch 52. The notch 79 has an upstanding wall 81 with a recess 82 therein adapted to receive the tab 56 on the lever 54 of the latch 52.

OPERATION

Although the operation of the structure described thus far will be apparent to those persons having ordinary skill in the art, a brief summary of the operation will be given for convenience purposes only.

When the support member 16 and the base member 17 are oriented to a first position, such as is illustrated on the right side of FIG. 1, the bottom edge of each of the sidewalls 61, 62, 63 and 64 of the support member 16 will rest on the upwardly facing surface 27 on the base member 17. Further, the elongated bar 46 and rivets 77 and 78 will be slid along the length of the slots 32, 33, 73 and 74 so that they will become spaced a maximum distance from the rivets 49 and 78. Further, the springs 51 will both be tensioned. The tab 56 on the latch mechanism 52 will be received in the recess 82 on the support member 16 to hold the assembly in the aforesaid first position so that little or no space is provided between the lower edge of the sidewalls 61, 62, 63 and 64 and the upwardly facing surface 27 on the base member 17.

Upon the application of a downwardly directed force on the end lever 54 remote from the tab 56, the wall 53 thereof will be flexed to cause the tab 56 to be removed from the recess 82. The tension springs 51 will promptly contract and draw the lowermost ends of the link members 39 and 41 together, thereby causing a lifting of the support member 16 away from the base member 17. In this second position, namely, the position illustrated on the left of FIG. 1, a tall drinking container, such as a soft drink can or a tall drinking cup, can be received in the hole 18 and be supported in an upright position thereby.

Figure 8:
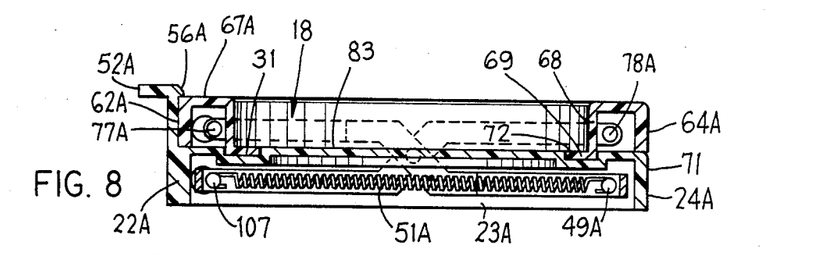
FIG. 8 is a sectional view taken along the line VIII—VIII of FIG. 7.

It is important to note that the diameter of the base of most cups having a handle on at least one side thereof, such as the cup 13 illustrated on the right of FIG. 1, is most generally larger in diameter than the base of a tall drinking container. Thus, when the support member 16 and the base member 17 are oriented to the first or collapsed position illustrated in FIGS. 3 and 8, the upwardly facing surface 72 on the flange 69 will be flush with the upwardly facing surface 27 of the base member 17. Thus, the bottom of the cup 13 will rest on a generally smooth surface defined by the upwardly facing surfaces 27 and 72. However, since the base diameter of a tall drinking cup is generally smaller than the base diameter of a cup 13 having a handle 14 on one or more sides thereof, the bottom of the tall drinking container will rest on the upwardly facing surface portion 83 encircled by the circular groove 31. The upwardly facing surface 83 is coplanar with the upwardly facing surface 27 on the base member 17. Further, and since the diameter of the tall drinking container adjacent the midheight thereof or the top is generally smaller than the base diameter of the drinking cup 13 having a handle 14 on one or more sides thereof, the radially innermost edge 84 of the flange 69 will serve to keep the base of the tall drinking container 19 centrally disposed on the upwardly facing surface 83.

Figure 4:
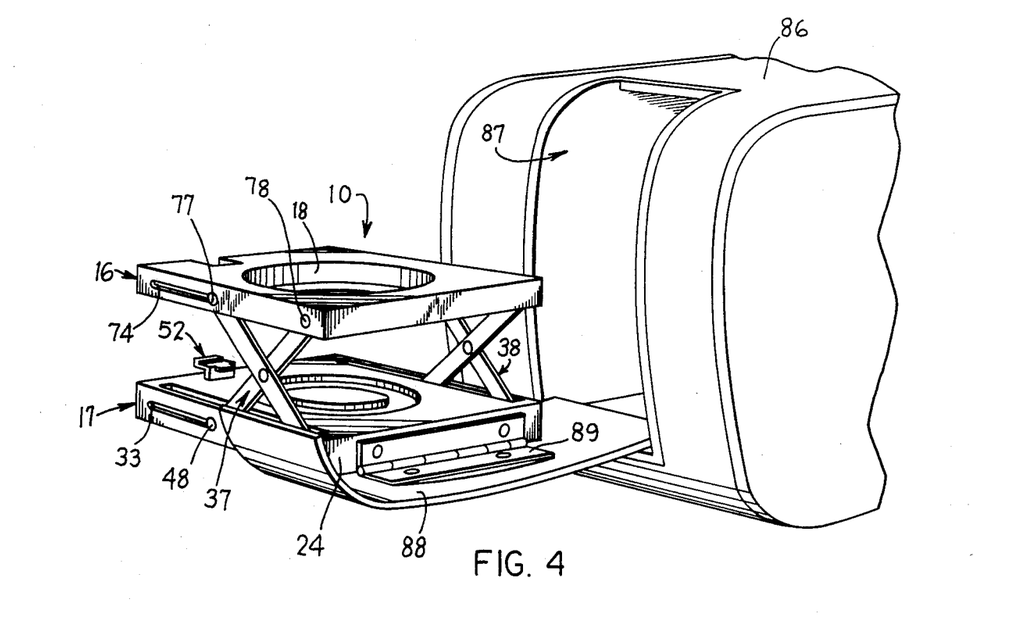
FIG. 4 is a perspective view of a collapsible holder in a second environment, namely, in the forwardmost end of an arm rest provided in the central portion of the seating in an automobile or other type of arm rest.
Figure 5:
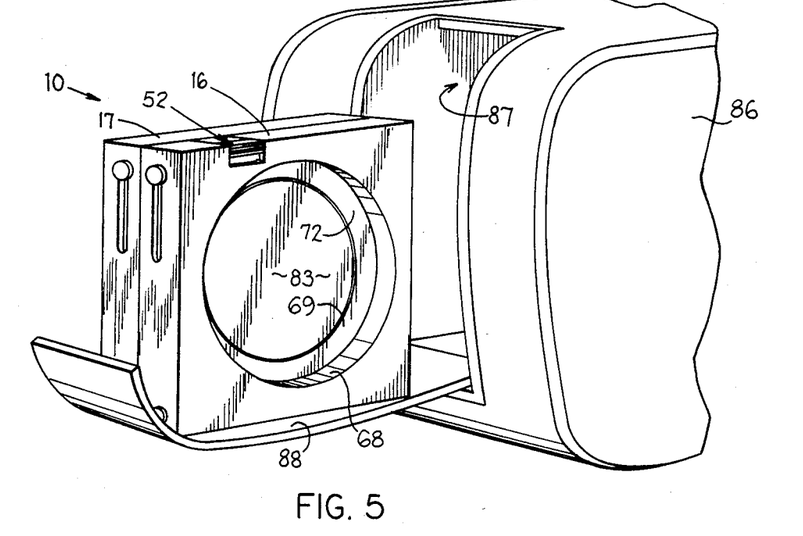
FIG. 5 is a perspective view similar to FIG. 4 but with the base member and support member oriented to a position enabling stowage in an opening provided in the end of the arm rest.
Figure 6:
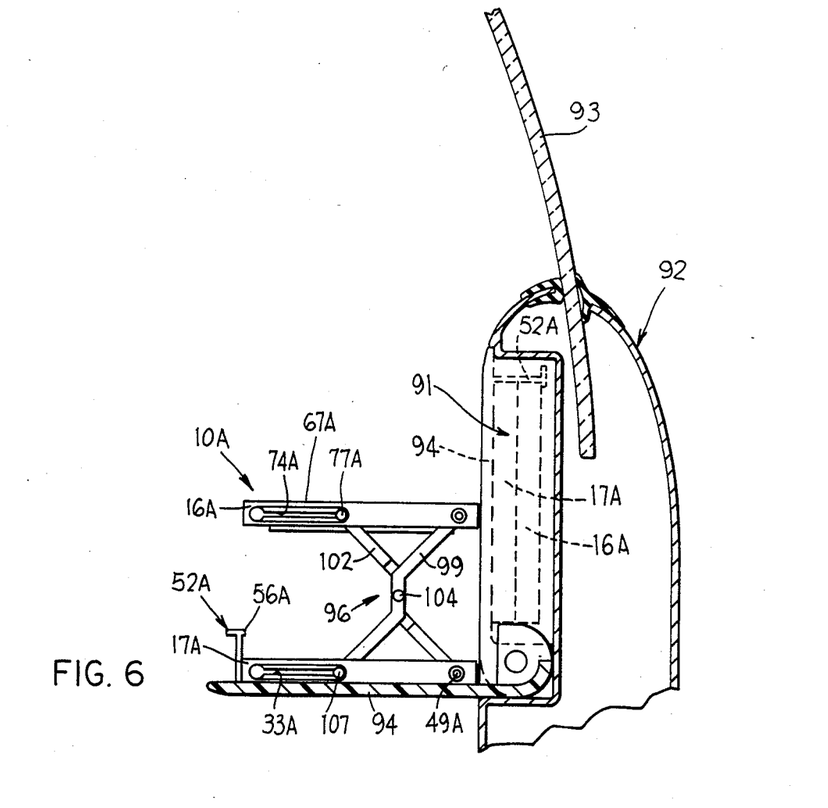
FIG. 6 is a sectional view of the collapsible holder in a third environment, namely, in a pocket provided in the door of a vehicle.
Figure 7:
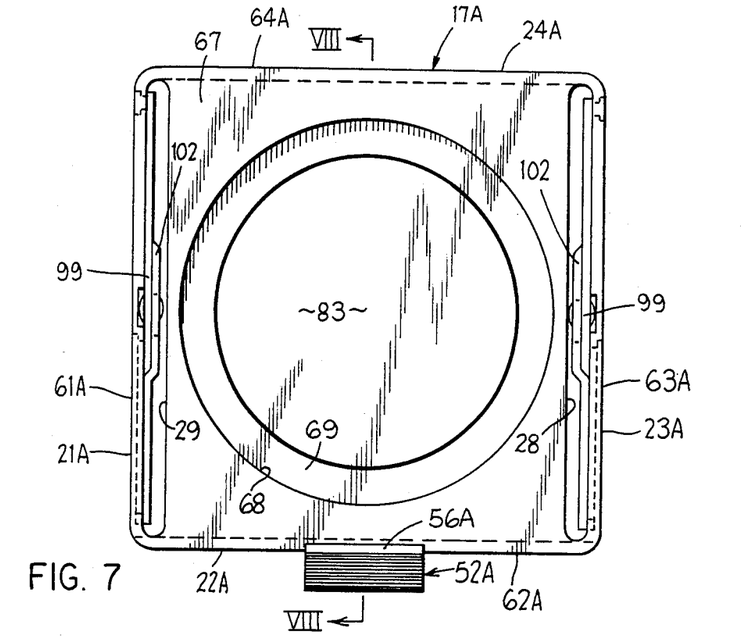
FIG. 7 is a top view of a further embodiment of the collapsible holder embodying the invention.

FIGS. 4 to 6 illustrate a different environment for the collapsible holder 10. In FIG. 4, an arm rest 86 is illustrated, which arm rest could be of a type utilized in conventional automobiles or arm rests utilized in association with aircraft seating or seating provided in mobile homes or vans. An opening 87 is provided in the forward end of the arm rest 86. A cover 88 is pivotally secured by any conventional type of means not illustrated to enable the cover 88 to move from the opened position illustrated in FIGS. 4 and 5 to a position closing the entirety of the opening 87. The sidewall 24 of the base member 17 is secured via a hinge 89 to the inside wall surface of the cover 88. In this particular embodiment, the cover 88 is opened to a position wherein the inside surface thereof becomes generally horizontally aligned. Thus, the hinge axis will also become horizontally oriented to enable the collapsed version of the collapsible holder 10 illustrated in FIG. 5 to be pivoted about the axis of the hinge 89 to the position illustrated in FIG. 4. Appropriate activation of the latch 52 will cause the support member 16 to separate from the base member 17 to the position illustrated in FIG. 4. When the collapsible holder 10 is in the collapsed position illustrated in FIG. 5, the cover 88 can be swung about its pivot support to move the collapsed support member 16 and base member 17 into the opening 87 in the arm rest 86.

In the embodiment of FIG. 6, a modified version of the collapsible holder 10A is illustrated. Several of the components utilized in this alternate construction serve the same purpose as has been described above. Therefore, the same reference numerals will be utilized to designate these components, but the reference numerals will have the suffix "A" added thereto.

In FIG. 6, the collapsible holder 10A is mounted in a pocket 91 provided on an inside wall of a door 92 to a vehicle. FIG. 6 illustrates the door 92 having a window glass 93 mounted thereon. The pocket 91 is covered by a cover 94 hingedly secured to the perimeter walls of the pocket 91 so that it can be pivoted between a broken line position illustrated in FIG. 6 and a solid line position thereof.

The support member 16A and the base member 17A are generally identical to the support members described above, except that the latch mechanism 52A and the tab 56A are oriented to overlap the upwardly facing surface 67A at a peripheral edge thereof, rather than being received in a notch in the sidewall of the support member. The latch mechanism 52A functions in the same manner as does the latch mechanism 52 described hereinabove.

Figure 9:
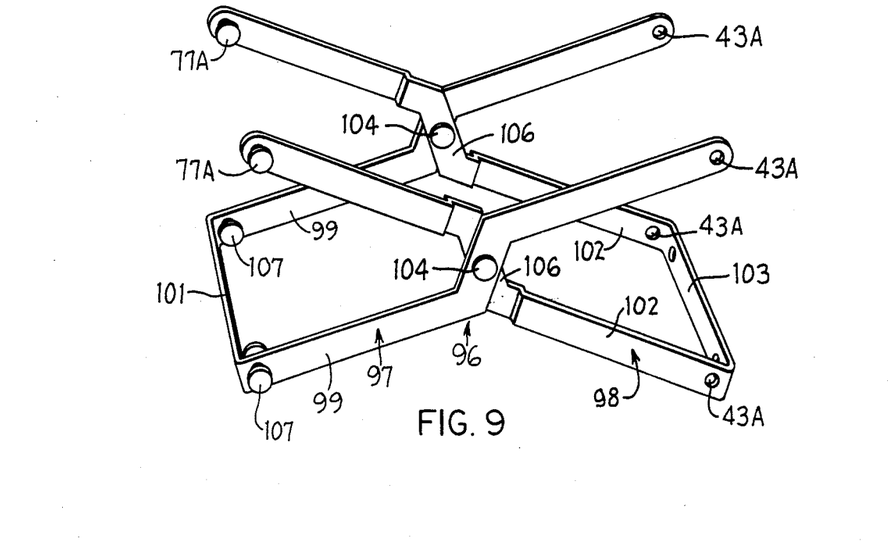
FIG. 9 is a perspective view of a modified linkage arrangement interconnecting the base member and the support member.

Further, a modified linkage mechanism 96 is provided and is illustrated in further detail in FIG. 9. The linkage mechanism is composed of two metal stampings 97 and 98, each U-shaped in their configuration. The two legs 99 of the metal stamping 97 are connected by a bight segment 101. Similarly, the legs 102 of the metal stamping 98 are connected by a bight segment 103. The legs 99 are parallel to each other as are the legs 102. Further, the legs 99 are each pivotally secured to a leg 102 by rivets 104. In this particular embodiment, the rivets 104 are each located approximately midlength of each of the legs 99 and 102. Further, the legs 102 have an offset segment 106 therein immediately adjacent the rivets 104 and receive therein the legs 99 so that the length of the bight segments 101 and 103 can be made identical to each other. Each of the legs 99 and 102 are inserted into the slots 28 and 29 from the bottom side of the base member 17. The upper ends of the legs 99 and 102 projecting above the upwardly facing surface 27 of the base member 17 are secured by conventional rivets to the support member 16A in a manner identical to that which has been described above. The tension springs 51 are each secured at their opposite ends to the rivets 49A and rivets 107 secured to the legs 99 adjacent the bight segment 101. The rivets 107 replace the elongated bar 46 described above.

For purposes of assembly of the linkage mechanism 96, the rivets 77A and 107 may be installed prior to insertion of the legs 99 and 102 into the slots 28 and 29 of the base member 17. In this particular instance, the ends of the elongated slots 32A and 33A, as well as the ends of the slots 73A and 74A adjacent the latch 52A, are enlarged to enable the receipt of the enlarged heads of the rivets 77A and 107 therein. Thereafter, the entire linkage mechanism 96 and the connected rivets 77A and 107 are slid lengthwise of the slots until the holes 43 become aligned with the appropriate holes 36A and 76A in the sidewalls 21A and 23A of the base member 17A and support member 16A, respectively. Thereafter, the rivets 49A and 78A may be placed into the respective holes 43.

The linkage mechanism 96 and, particularly, the interconnected U-shaped stampings 97 and 98, results in a stabilized support member 16A when it is in the raised position.

Figures 10, 12:
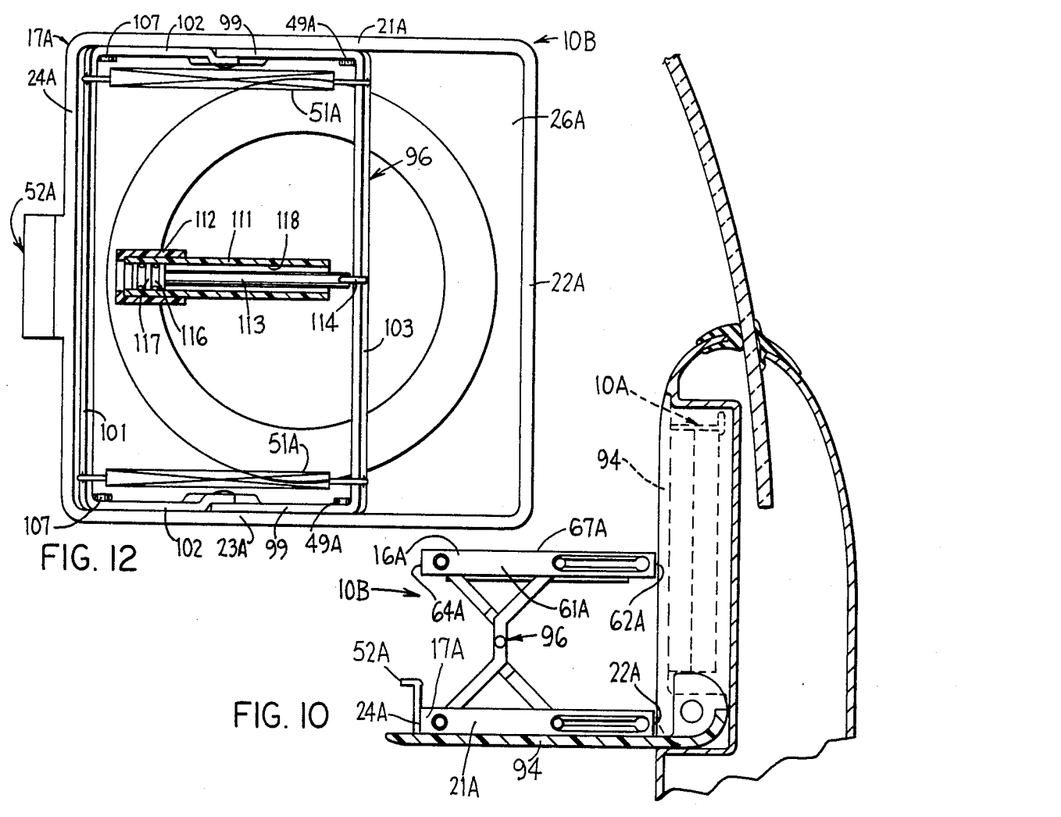
FIG. 10 is a sectional view similar to FIG. 6 but where the linkage arrangement is oriented differently on the base member and the support member.
FIG. 12 is a bottom view similar to FIG. 11 but with the damping mechanism in a second position.

FIG. 10 illustrates an embodiment 10B and an environment similar to FIG. 6, but the latch mechanism 52A is oriented on the sidewall 24A of the support member 17A opposite the illustration in FIG. 6. In other words, the linkage mechanism 96 is oriented closer to the latch 52A than it is in FIG. 6. The orientation of the linkage mechanism 96 in FIG. 10 enables the user to depress the upwardly facing surface 67A of the support member 16A along the edge immediately above the latch mechanism 52A. In the embodiment of FIG. 6, it has been discovered that the application of a downward force on the edge of upwardly facing surface 67A of the support member 16A above the latch 52A results in a moment about the axis of the rivet 107 and causes the rivet to become frictionally engaged with the edge of the slots 32A and 33A to prevent a smooth sliding of the rivet 107 toward the latch mechanism 52A. As a result, the user must apply a force directly over the linkage 96 in order to cause the support member 16A to collapse toward the base member 17A. A smooth collapsing movement occurs in the embodiment of FIG. 10 with a downward force applied to the edge of the surface 67 above the latch 52A.

Figure 11:
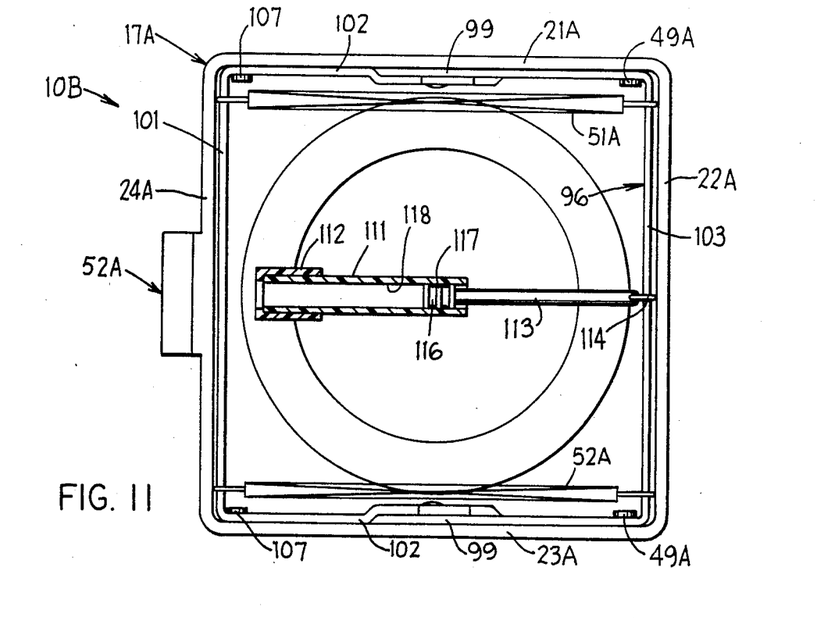
FIG. 11 is a bottom view of the support member with a damping mechanism in a first position.

FIGS. 11 and 12 illustrate the collapsible holder 10B but from the underside of the base member 17A. As shown, the tension springs 51A are secured to and extend between the bight segments 101 and 103 of the linkage mechanism 96. In this particular embodiment, an elongated cylinder housing 111 is secured to the underside of the top wall 26A intermediate the legs 99 and 102 of the linkage mechanism 96. The longitudinal axis of the cylinder housing 111 extends perpendicular to the longitudinal axis of the bight segments 101 and 103. Further, the longitudinal axis of the cylinder 111 is parallel to the upwardly facing surface 27A on the base member 17A. If needed, an adapter plate 112 can be utilized between the cylinder housing 111 and the bottom surface of the top wall 26A to accommodate a variation in the surface caused by the circular groove 31A in the top surface 27A. A plunger rod 113 is secured to the bight segment 103 by any conventional and loose structure such as a ring 114 received through openings in the bight segment 103 and the end of the plunger to thereby accommodate variations in the orientation of the bight segment 103 relative to the plunger 113. A piston 116 is mounted on the end of the plunger 113 remote from the bight segment 103. The piston has plural rubber segments 117 thereon which frictionally engage the interior surface 118 in the cylinder housing 111 to resist movement of the plunger axially along the length of the cylinder 111. The end of the cylinder housing 111 remote from the bight segment 103 is open to allow air to flow out the end as the piston 116 moves axially toward the bight segment 101. The frictional engagement of the rubber segments or lands 117 on the piston 116 is sufficient to resist rapid movement of the bight segment 103 toward the bight segment 101 when the support member 16A is being elevated above the base member 17A. As a result, such movement of the support member 16A will be slow and steady as the tension springs 51A contract.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A collapsible holder for a container, comprising:
   a plate-like base member having a surface thereon and mounting means for supporting said base member so that said surface is oriented to face upwardly;
   a plate-like support member having means defining a hole therethrough along an axis perpendicular to said upwardly facing surface on said base member;
   yieldable force generating means interconnecting said base member and said support member for continually urging said support member and base member from a first portion wherein said base member and support member are in a mutually adjacent relation with little or no space therebetween being extant to a second position vertically spaced from each other while maintaining said upwardly facing relation of said one surface, said yieldable force generating means including linkage means for guidingly interconnecting said base member and said support member, and spring means for urging a separation of said base member and said support member guided by said linkage means, said linkage means including a pair of lateral spaced first links each pivotally secured at one end thereof to said base member and for movement about a first common axis, a second pair of laterally spaced second links each pivotally secured at one end thereof to said base member and for movement about a second common axis parallel to said first axis, pivot means pivotally securing said first links to said second links at the midportion thereof, the other ends of each said first link and said second link being pivotally secured to said support member and for movement about respective and spaced common axes parallel to said first and second common axes, one of said common axes on said base member and the common axis on said support member located thereabove being mounted in an elongated slot to enable each said common axis to move toward and away from the other of said common axes;
   releasable latch means for holding said base member and said support member in said first position;

whereby a release of said latch means will enable said force generating means to urge a separation of said base member and said support member to said second position, a container resting on said upwardly facing surface extending through and being encircled by said means defining a hole in said support member so that said container is stabilized thereby.

2. The collapsible holder according to claim 1, wherein said base member and said support member have the same peripheral dimensions and wherein said linkage means includes means for maintaining said base member and said support member one directly above the other in said first and second positions thereof.

3. The collapsible holder according to claim 1, wherein said linkage means includes a means for maintaining said base member and said support member one directly above the other in all positions relative to each other, including positions intermediate said first and second positions.

4. The collapsible holder according to claim 1, wherein said latch means is oriented adjacent said common axes mounted in said elongated slot.

5. The collapsible holder according to claim 1, wherein said latch means is oriented adjacent said common axes from said elongated slot.

6. The collapsible holder according to claim 1, wherein said spring means includes at least one tension spring interconnecting said first and second common axes on said base member, said tension spring being tensioned when said axes are spaced furthest from each other.

7. The collapsible holder according to claim 6, wherein a pair of said tension springs are provided, one on each lateral side of said base member.

8. The collapsible holder according to claim 1, wherein said pair of first links are integrally connected to each other adjacent said first common axis, and wherein said pair of second links are integrally connected to each other adjacent said second common axes.

9. The collapsible holder according to claim 1, wherein said base member and said support member are polygonally shaped.

10. The collapsible holder according to claim 9, wherein said base member and said support member are generally square.

11. The collapsible holder according to claim 1, wherein said upwardly facing surface on said base member has a pair of laterally spaced slots therein receiving therein said linkage means.

12. The collapsible holder according to claim 1, wherein said latch means includes a lever movably mounted on said base member between first and second positions, said lever having a tab overlapping, when in said first position thereof, an upwardly facing surface on said support member to effect a holding of said base member and said support member in said first position, said tab being movable from said first overlapping position to said second position thereof to enable said yieldable force generating means to urge a separating of said base member and said support member to said second position thereof.

13. The collapsible holder according to claim 1, wherein when said base member and said support member are in said first position, said holder being adapted to hold a short container or a container having a handle on one or more sides thereof, such as a cup or mug, and when said base member and said support member are in said second position, said holder being adapted to hold a tall container, such as a soft drink can or a tall drinking container.

14. A collapsible holder for a container, comprising:
a plate-like base member having a surface thereon and mounting means for supporting said base member so that said surface is oriented to face upwardly;
a plate-like support member having means defining a hole therethrough along an axis perpendicular to said upwardly facing surface on said base member, said base member having an annular recess of finite depth in the central portion of said upwardly facing surface, said suport member having means defining a hole therein having a vertically extending cylindrical wall and a radially inwardly extending lip at the lower end of said cylindrical wall;
yieldable force generating means interconnecting said base member and said support member for continually urging said support member and base member from a first position wherein said base member and support member are in a mutually adjacent relation with little or no space therebetween being extant to a second position vertically spaced from each other while maintaining said upwardly facing relation of said one surface, said lip being received in said annular recess when said base member and said support member are in said first position such that the upper surface of said lip is flush with said upwardly facing surface;
releasable latch means for holding said base member and support member in said first position;
whereby a release of said latch means will enable said force generating means to urge a separation of said base member and said support member to said second position, a container resting on said upwardly facing surface extending through and being encircled by said means defining a hole in said support member so that said container is stabilized.

15. A collapsible holder for a container, comprising:
a plate-like base member having surface thereon and mounting means for supporting said base member so that said surface is oriented to face upwardly;
a plate-like support member having means defining a hole therethrough along an axis perpendicular to said upwardly said facing surface on said base member;
yieldable force generating means interconnecting said base member and said support member for continually urging said support member and base member from a first position wherein said base member and support member are in a mutually adjacent relation with little or no space therebetween being extant to a second position vertically spaced from each other while maintaining said upwardly facing relation of said one surface; and
releasable latch means for holding said base member and said support member in said first position, said latch means including a lever movably mounted on said base member between third and fourth positions, said lever having a tab overlapping, when in said third position thereof, an upwardly facing surface on said support member to effect a holding of said base member and said support member in said first position, said tab being movable from said third overlapping position to said fourth position thereof to enable said yieldable force generating means to urge a separating of said base member and said support member to said second position thereof.

16. A collapsible holder for a container, comprising:

a plate-like base member having a surface thereon and mounting means for supporting said base member so that said surface is oriented to face upwardly;

a plate-like support member;

yieldable force generating means interconnecting said base member and said support member for continually urging said support member and base member from a first position wherein said base member and support member are in a mutually adjacent relation with little or no space therebetween being extant to a second position vertically spaced from each other while maintaining said upwardly facing relation of said one surface;

at least said support member having drinking container support means thereon for encircling and supporting a bottom portion of a short container or a container having a handle on one or more sides thereof when said base member and said support member are in said first position, and for encircling and supporting a mid-height portion of a tall container, such as a soft drink can or a tall drinking container when said base member and said support member are in said second position;

releasable latch means for holding said base member and support member in said first position;

whereby a release of said latch means will enable said force generating means to urge a separation of said base member and said support member to said second position, a container resting on said upwardly facing surface extending through and being encircled by said drinking container support means on said support member so that said container is stabilized thereby.

* * * * *

UNITED STATES PATENT AND TRADEMARK OFFICE
CERTIFICATE OF CORRECTION

PATENT NO. : 4 583 707

DATED : April 22, 1986

INVENTOR(S) : Kenneth J. Anderson

It is certified that error appears in the above-identified patent and that said Letters Patent is hereby corrected as shown below:

Column 9, Line 25; After "axes" insert ---remote---.

Signed and Sealed this

Twenty-sixth Day of August 1986

[SEAL]

Attest:

DONALD J. QUIGG

Attesting Officer

Commissioner of Patents and Trademarks